(12) United States Patent
Kitagawa et al.

(10) Patent No.: US 12,481,001 B2
(45) Date of Patent: Nov. 25, 2025

(54) BATTERY MEASUREMENT SYSTEM

(71) Applicant: DENSO CORPORATION, Kariya (JP)

(72) Inventors: Fukuo Kitagawa, Nisshin (JP); Motomasa Iizuka, Nisshin (JP); Hisayoshi Ota, Nisshin (JP); Masaaki Kitagawa, Kariya (JP)

(73) Assignee: DENSO CORPORATION, Kariya (JP)

(*) Notice: Subject to any disclaimer, the term of this patent is extended or adjusted under 35 U.S.C. 154(b) by 135 days.

(21) Appl. No.: 18/400,509

(22) Filed: Dec. 29, 2023

(65) Prior Publication Data

US 2024/0133966 A1   Apr. 25, 2024
US 2024/0230776 A9   Jul. 11, 2024

Related U.S. Application Data

(63) Continuation of application No. PCT/JP2022/022639, filed on Jun. 3, 2022.

(30) Foreign Application Priority Data

Jun. 29, 2021 (JP) .................... 2021-107928

(51) Int. Cl.
*G01R 31/389* (2019.01)
*H01M 10/0587* (2010.01)
(Continued)

(52) U.S. Cl.
CPC ...... *G01R 31/389* (2019.01); *H01M 10/0587* (2013.01); *H01M 10/48* (2013.01); *H01M 50/569* (2021.01)

(58) Field of Classification Search
CPC ............. G01R 31/389; H01M 50/569; H01M 10/0587; H01M 10/48
(Continued)

(56) References Cited

U.S. PATENT DOCUMENTS

2012/0316815 A1* 12/2012 Morigaki ............. G01R 31/392
                                                          702/63
2021/0123981 A1*  4/2021 Boss ................... G01R 31/387
2023/0393215 A1* 12/2023 Bao .................... G01R 31/367

FOREIGN PATENT DOCUMENTS

JP    2018-190502 A    11/2018
JP    2021-117221 A     8/2021

OTHER PUBLICATIONS

Aug. 16, 2022 International Search Report issued in International Patent Application No. PCT/JP2022/022639.

* cited by examiner

*Primary Examiner* — Huy Q Phan
*Assistant Examiner* — Trung Q Nguyen
(74) *Attorney, Agent, or Firm* — Oliff PLC

(57) ABSTRACT

A battery measurement system includes: a battery including terminals and a housing case, and a battery measurement device. The battery measurement device includes: a signal control unit provided on a first electrical path connecting positive and negative electrode external terminals and configured to receive or apply an AC signal, a response signal input unit provided on a second electrical path connecting positive and negative electrodes of an electrode body and configured to receive a response signal to the AC signal, and a calculation unit configured to calculate complex impedance information based on the response signal. The second electrical path is wired from the response signal input unit toward the inside of the housing case so that a magnetic flux passage area surrounded by the electrode body and the second electrical path is smaller in magnitude than an area surrounded by the electrode body, the terminals and the housing case.

12 Claims, 11 Drawing Sheets

(51) Int. Cl.
*H01M 10/48* (2006.01)
*H01M 50/569* (2021.01)
(58) Field of Classification Search
USPC .............. 324/500, 600, 76.11, 423–430
See application file for complete search history.

COMPARATIVE EXAMPLE

PRESENT EMBODIMENT

BATTERY MEASUREMENT SYSTEM

CROSS-REFERENCE TO RELATED APPLICATION

The present application is a continuation application of International Application No. PCT/JP2022/022639, filed on Jun. 3, 2022, which claims priority to Japanese Patent Application No. 2021-107928 filed on Jun. 29, 2021. The contents of these applications are incorporated herein by reference in their entirety.

BACKGROUND

Technical Field

The present disclosure relates to battery measurement systems having a battery and a battery measurement device for measuring the state of a battery.

Background Art

A related system calculates a complex impedance of a battery so as to measure the state of the battery. Patent document 1 discloses a technique in which an oscillator provides an alternating current signal such as a sine wave current to a battery, and a lock-in amplifier detects a response signal (representing a voltage variable) corresponding to the alternating current signal. Further, the related technique calculates complex impedance characteristics based on the alternating current signal and the response signal, and measures the condition such as deterioration state of the battery.

SUMMARY

In the present disclosure, provided is a battery measurement system as the following.

The battery measurement system comprising a battery and a battery measurement device. The battery comprises: a housing case that accommodates an electrode body, and terminals. The battery measurement device comprises: a signal control unit provided on a first electrical path and configured to receive or apply an alternating current signal, the first electrical path connecting a positive external terminal and a negative external terminal of terminals; a response signal input unit provided on a second electrical path and configured to receive a response signal to the alternating current signal, the second electrical path connecting a positive electrode and a negative electrode of the electrode body; and a calculation unit configured to calculate information regarding a complex impedance of the battery based on the response signal. The second electrical path is wired from the response signal input unit toward the inside of the housing case so that the magnetic flux passage area surrounded by the electrode body and the second electrical path is smaller in magnitude than an area surrounded by the electrode body, the terminals and the housing case.

BRIEF DESCRIPTION OF THE DRAWINGS

A preferred, non-limiting embodiment of the present disclosure will be described by way of example with reference to the accompanying drawings.

DETAILED DESCRIPTION OF THE PREFERRED EMBODIMENTS

[PTL 1] JP 2018-190502 A

Figure 1:
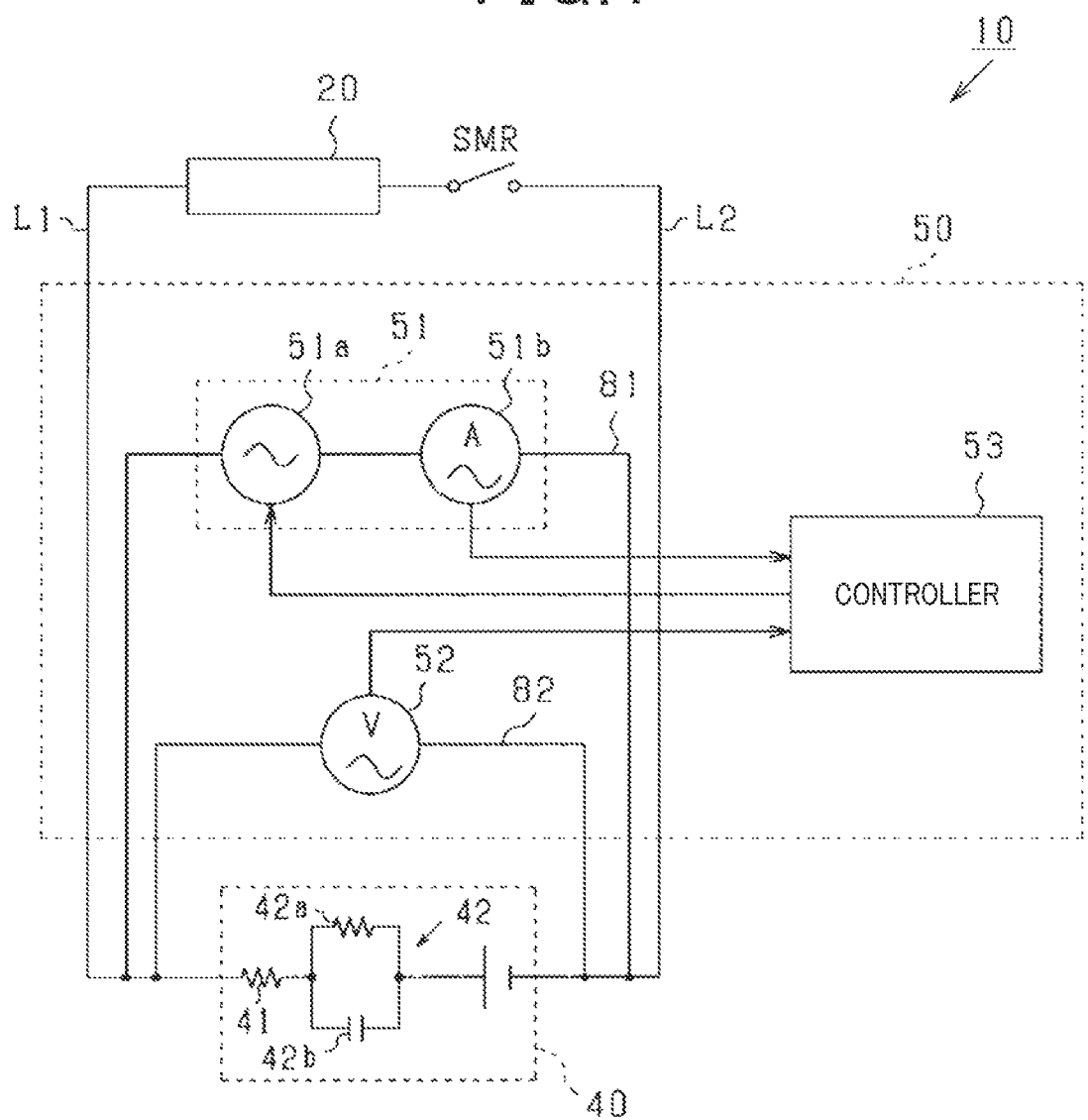
FIG. 1 is a view showing a circuit structure of a power source system.

In Patent document 1, batteries to be used for electric vehicles have a tendency to increase in capacity thereof. Because the increasing of the capacity of the batteries reduces the impedance thereof, external conditions easily affect a high-capacity battery. For example, when an alternating current signal is supplied to the battery, an induced electromotive force is generated in an electrical path, in which the response signal is transmitted, by a magnetic flux variation caused by the alternating current signal. This causes a detected response signal error, and a complex impedance calculated based on the detected response signal includes an error component.

The present disclosure has been made in consideration of the foregoing circumstances, and it is an object of the present disclosure to provide a battery measurement system having improved measurement accuracy of a complex impedance of a battery.

In order to solve the drawbacks previously described, the present disclosure provides a battery measurement system comprising a battery and a battery measurement device. The battery measurement device measures a state of the battery. The battery comprises an electrolyte, an electrode body having a pair of electrodes, a housing case and a pair of terminals. The housing case accommodates the electrolyte and the electrode body. Each of the pair of terminals is connected to a corresponding one of the pair of electrodes. At least a part of the pair of terminals projects outside from an outer surface of the housing case. The battery measurement device comprises a signal control unit, a response signal input unit, and a calculation unit. The signal control unit is provided on a first electrical path, and configured to cause the battery to output a predetermined alternating current signal, or apply the predetermined alternating current signal to the battery. The first electrical path connects a positive external terminal and a negative external terminal which project outside from the outer surface of the housing case among the pair of terminals. The response signal input unit is provided on a second electrical path, and configured to receive a response signal to the alternating current signal provided from the battery via the second electrical path. The second electrical path connects a positive electrode and a negative electrode of the electrode body. The calculation unit calculates information regarding a complex impedance of the battery based on the response signal. The second electrical path is wired from the response signal input unit arranged outside of the battery toward the inside of the housing case. The second electrical path is connected to the positive electrode and the negative electrode of the electrode body inside the housing case. A magnetic flux passage area is formed, which is surrounded by the electrode body and the second electrical path, and through which a magnetic flux generated based on an alternating current signal flowing through the first electrical path passes. The second electrical path is wired inside of the housing case so that the magnetic flux passage area inside the housing case is smaller in magnitude than an area surrounded by the electrode body, the pair of terminals and the housing case.

When a response signal is input in the second electrical path different in route from the first electrical path due to the alternating current signal flowing through the first electrical path, an induced electromotive force is generated in the second electrical path based on the alternating current signal flowing through the first electrical path. The generation of the induced electromotive force causes error of a complex impedance calculated based on the response signal.

The present disclosure has been developed that such induced electromotive force generated in the second electrical path can be adjusted by varying the magnitude of the magnetic flux passage area surrounded by the electrolyte and the second electrical path. Accordingly, the present disclosure provides a structure in which the second electrical path is wired toward a direction inside of the housing case, and is connected to the positive electrode and the negative electrode of the electrode body inside of the housing case. The second electrical path is wired so that the magnetic flux passage area inside of the housing case becomes smaller in magnitude than the area surrounded by the electrode body, the pair of terminals and the housing case. As a result, compared to the case where the second electrical path, through which the positive external terminal and the negative external terminal are connected, is arranged outside of the housing case, the magnitude of the magnetic flux passage area inside of the housing case can be reduced, and error of a complex impedance can be suppressed.

First Embodiment

Next, a description will be given of a first embodiment of the present disclosure in which a battery measurement system is applied to a power source system of a vehicle (for example, a hybrid vehicle or an electric vehicle) with reference to the drawings.

As shown in FIG. 1, a power source system 10 has an electric load 20 such as a rotating electric machine (a motor generator), a battery 40 and a battery measurement device 50. The battery measurement device 50 measures the battery state of the battery 40.

The battery 40 is connected to an electric load 20. A relay switch SMR (a system main relay switch) is arranged at least one of a positive electrode side power source path L1 and a negative electrode side power source path L2. A positive electrode of the battery 40 is connected to an electrical load 20 through the positive electrode side power source path L1. A negative electrode of the battery 40 is connected to the electrical load 20 through the negative electrode side power source path L2. The relay switch SMR is configured to allow the battery 40 to supply an electric power to the electrical load 20, and also to prohibit the battery 40 from supplying the electric power to the electrical load 20. For example, it is possible to use a lithium-ion battery as the battery 40.

A description will now be given of the structure of the battery 40 with reference to FIG. 2. The battery 40 has an electrolyte 43, an electrode body 44 having a flat rolled shape, and a housing case 45 of a cuboid shape. The housing case 45 accommodates the electrolyte 43 and the electrode body 44. The electrolyte 43 is a non-aqueous electrolyte in which a lithium salt such as lithium hexafluorophosphate (fluoride) is dissolved in an organic solvent such as ethylene carbonate or diethyl carbonate. The housing case 45 is made of aluminum alloy, for example. External terminals 46 (a positive electrode external terminal 46a and a negative electrode external terminal 46b) are arranged at both sides in a longitudinal direction of the upper surface of the housing case 45.

Figure 3A:
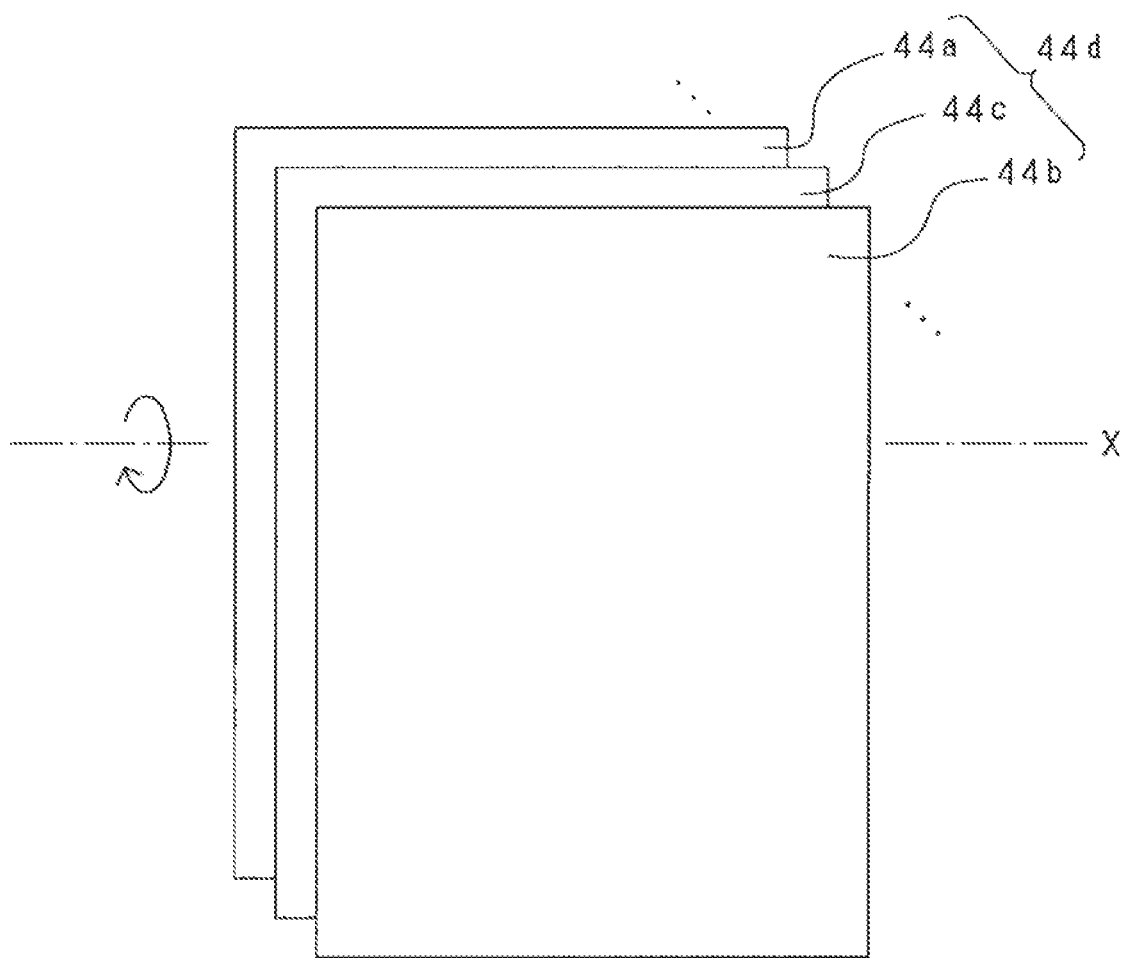
FIG. 3A and FIG. 3B are views showing a structure of an electrode body.
Figure 3B:
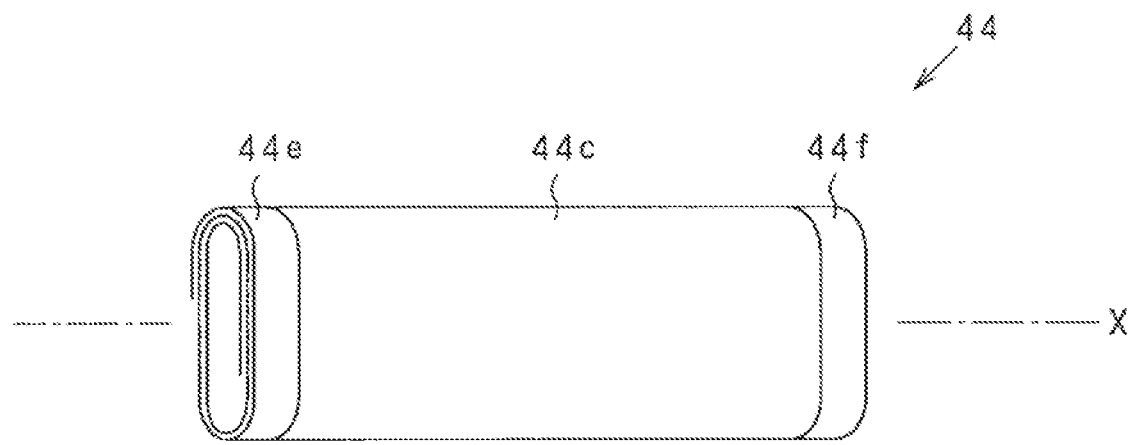

As shown in FIG. 3A, the electrode body 44 has a laminated body 44d. The laminated body 44d has a plurality of positive electrode conductive plates 44a, a plurality of negative electrode conductive plates 44b, and a plurality of separators 44c. Each of the separators 44c is sandwiched between the respective positive electrode conductive plate 44a and the respective negative electrode conductive plate 44b. As shown in FIG. 3B, the laminated body 44d is wound to form electrode body 44.

In more detail, each of the positive electrode conductive plates 44a is composed of a positive electrode metal foil such as an aluminum foil and positive electrode active material applied on both surfaces of the positive electrode metal foil. Each of the negative electrode conductive plates 44b is composed of a negative electrode metal foil such as a copper foil and negative electrode active material applied on both surfaces of the negative electrode metal foil. Each of the separators 44c is a porous insulation film made of polyethylene resin. As shown in FIG. 3B, the electrode body 44 as a winding body is constructed by flatly winding the laminated body 44d in a predetermined direction X, where the laminated body 44d is composed of the positive electrode conductive plates 44a, the negative electrode conductive plates 44b and the separators 44c.

In the structure of the laminated body 44d, the electrode conductive plates 44a project on a first side of the axial direction X, and the negative electrode conductive plates 44b project on a second side of the axial direction X. In the electrode body 44, a positive electrode 44e composed of the positive electrode conductive plate 44a projecting on the first side of the axial direction X is formed, and a negative electrode 44f composed of the negative electrode conductive plate 44b projecting on the second side of the axial direction X is formed. The outer surface of the electrode body 44 between the positive electrode 44e and the negative electrode 44f as the pair of electrodes is insulated by the separators 44c. The electrode body 44 is covered with an insulating cover (not shown), and is accommodated inside of the housing case 45.

Figure 2:
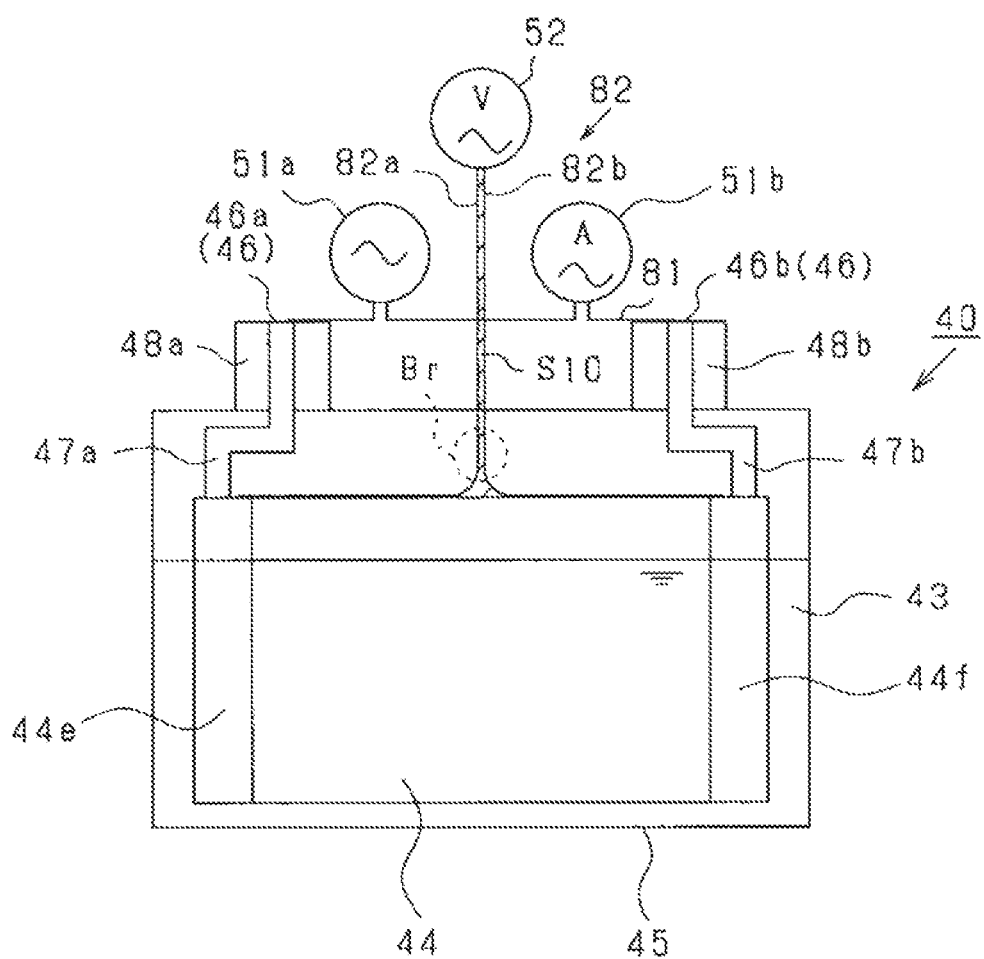
FIG. 2 is a view showing a connection structure of a battery measurement device and a battery according to a first embodiment.

As shown in FIG. 2, the positive electrode 44e of the electrode body 44 is connected, by crimping, etc., to a first side of a positive electrode conductor 47a which is as a positive electrode terminal. A second side of the positive electrode conductor 47a protrudes outside from the housing case 45. The protruding part of the positive electrode conductor 47a forms a positive electrode exterior terminal 46a. Similarly, the negative electrode 44f of the electrode body 44 is connected, by crimping, etc., to a first side of a negative electrode conductor 47b which is a negative electrode terminal. A second side of the negative electrode conductor 47b protrudes outside from the housing case 45. The protruding part of the negative electrode conductor 47b forms a negative electrode exterior terminal 46b. A gap between the positive electrode conductor 47a and the housing case 45 is sealed with a positive electrode sealing member 48a, and insulated. Similarly, a gap between the negative electrode conductor 47b and the housing case 45 is sealed with a negative electrode sealing member 48b, and insulated.

A description will be given of the battery measurement device 50 with reference to FIG. 1. The battery measurement device 50 is a device for measuring a state of charge (SOC) and state of health (SOH) of the battery 40. The battery measurement device 50 has a current modulation circuit 51, a voltmeter 52 and a controller 53.

The current modulation circuit 51 is a circuit of applying a predetermined alternative current signal to the battery 40 as a measurement target. Specifically, the current modulation circuit 51 has an oscillator 51a, and an ammeter 51b connected in series to the oscillator 51a. The current modulation circuit 51 is connected to the battery 40 through a first electrical path 81.

The oscillator 51a is configured to receive an instruction signal provided from the controller 53. The oscillator 51a as a signal control unit generates an alternating current signal based on the instruction signal, and applies the generated alternating current signal to the battery 40. For example, the alternating current signal is a sine wave signal and a square wave signal. The ammeter 51b measures a current signal flowing through the first electrical path 81, and outputs the measured current signal to the controller 53.

The voltmeter 52 is connected to the battery 40 through the second electrical path 82, which is different (or independent) from the first electrical path 81. The voltmeter 52 as a response signal input unit receives a response signal (voltage fluctuation) reflecting the complex impedance information of the battery 40 between the terminals of the battery 40 when the alternating current signal is input. The voltmeter 52 is configured to measure the response signal, and to output the measured response signal to the controller 53.

FIG. 1 shows an equivalent circuit model of the complex impedance of the battery 40. The internal complex impedance of the battery 40 in the equivalent circuit model is composed of a series circuit of an ohmic resistance 41 and a reaction resistor 42. The ohmic resistance 41 corresponds to an energization resistance of the electrodes and electrolyte constituting the battery 40. The reaction resistor 42 represents a resistance generated by an electrode interfacial reaction on the electrodes. The reaction resistor 42 can be represented by a parallel circuit of a resistance component 42a and a capacity component 42b.

The controller 53 is configured to have a microcomputer, etc. The microcomputer is equipped with a memory for storing programs. The controller 53 executes the programs stored in the memory so as to perform various control functions. The controller 53 outputs an instruction signal to the oscillator 51a so as to apply the alternating current signal to the battery 40. The controller 53 as the calculation unit calculates information regarding a complex impedance (Zm) of the battery 40 based on the response signal and the current signal. That is, the controller 53 calculates a real part (ReZm) and an imaginary part (ImZm) of the complex impedance based on the response signal and the current signal. The controller 53 makes a complex impedance plane plot (Cole-Cole plot) based on calculation results and obtains the characteristics of the electrodes and the electrolyte of the battery. The controller 53 detects a state of charge (SOC) and state of health (SOH) of the battery 40.

It is not necessary to make the overall Cole-Cole plots. It is sufficient to make a part of the overall Cole-Cole plots. For example, during a vehicle running, it is acceptable to measure a complex impedance at a specific frequency periodically every constant time interval, and to obtain the variation of SOC, SOH and battery temperature, etc. during the vehicle running based on the time variation of the complex impedance at the specific frequency. It is also acceptable to measure the complex impedance at the specific frequency every specific period, for example, every day, every period, and every year, and to obtain the variation of SOH, etc. of the battery based on the time variation of the complex impedance at the specific frequency.

When the current modulation circuit 51 applies the alternating current signal to the battery 40 through the first electrical path 81, an induced electromotive force is generated in the second electrical path 82 based on the alternating current signal. The voltmeter 52 measures a response signal provided from the battery 40 through the second electrical path 82. Accordingly, when the induced electromotive force is generated in the second electrical path 82 based on the alternating current signal, the measured response signal (voltage variable) includes detection error. The present disclosure provides the improved structure of the battery 40 and the battery measurement device 50 capable of reducing such an induced electromotive force.

Figure 4:
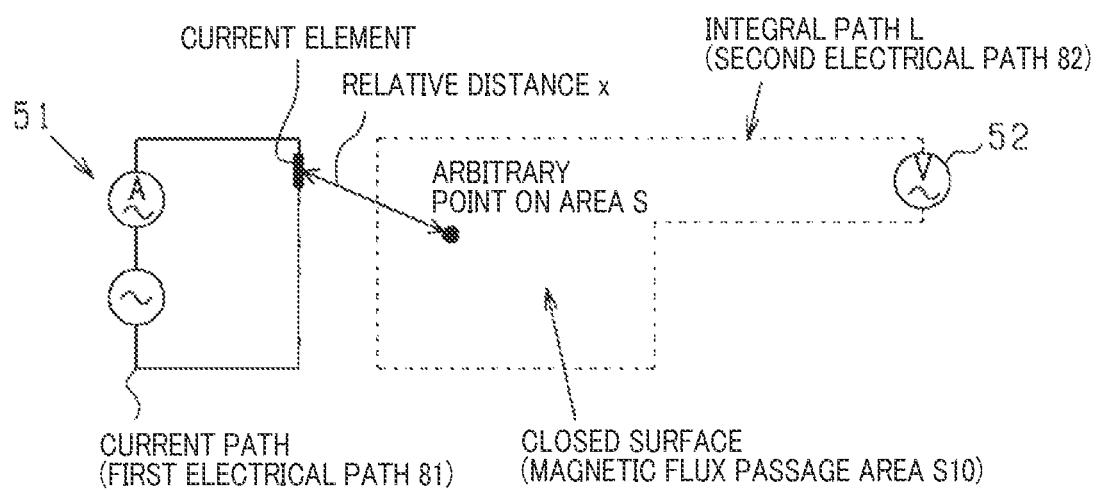
FIG. 4 is a view showing a circuit structure of the battery measurement device.

Before the explanation of the structure to reduce the induced electromotive force, a description will be given of the principles of generating such an induced electromotive force and the principles of reducing the induced electromotive force with reference to FIG. 4. FIG. 4 shows a general model of the first electrical path 81 and the second electrical path 82.

Formula (1) expresses Faraday's law, where E (x, t) designates an electric field vector, L designates a line integral path, B (x, t) designates a magnetic flux density vector, S designates an area closed by the portion surrounded by the line integral path at the left side of the formula (1), n designates a normal line vector at a point on the closed area S, x designates a position vector which represents a relative distance measured from a current element, and t designates time. That is, the electric field vector E (x, t) and the magnetic flux density vector B (x, t) are parameters depending on place and time. Vi (t) designates an induced electromotive force.

The present embodiment uses the following parameters. E (x,t) designates the electric field vector in the second electrical path 82, L designates the second electrical path 82, and B (x, t) designates the magnetic flux density vector representing the magnetic flux passing through the magnetic flux passage area S10, where the magnetic flux is generated due to the alternating current signal flowing through the first electrical path 81. S designates a surface of the magnetic flux passage area S10, and x designates the position vector representing the relative distance measured from the current element set on the first electrical path 81. Vi (t) designates the induced electromotive force generated in the second electrical path 82.

$$Vi(t) \equiv \oint_L E(x, t) \cdot dL = -\int_S \frac{\partial}{\partial t} B(x, t) \cdot n dS \qquad (1)$$

According to Faraday's law, it can be recognized that the induced electromotive force can be reduced according to the reduction of the magnetic flux passage area S10 surrounded by the second electrical path 82. In order to suppress the induced electromotive force, the present embodiment provides the improved structure of the first electrical path 81 and the second electrical path 82.

As shown in FIG. 2, the first electrical path 81 is wired outside of the housing case 45, and the positive electrode exterior terminal 46a is connected to the negative electrode exterior terminal 46b through the first electrical path 81. That is, through the first electrical path 81, the positive electrode exterior terminal 46a is connected to the negative electrode exterior terminal 46b in the exterior of the housing case 45.

On the other hand, the second electrical path 82 is wired from the exterior of the housing case 45 into inside of the housing case 45 so that the second electrical path 82 connects the positive electrode 44e and the negative electrode 44f of the electrode body 44. That is, the positive electrode 44e and the negative electrode 44f of the electrode body 44 are connected through the second electrical path 82. Specifically, the second electrical path 82 is wired from the voltmeter 52 located outside of the housing case 45 to the inside of the hosing casing 45, and the second electrical path 82 is connected to the positive electrode 44e and the negative electrode 44f of the electrode body 44 in the inside of the housing case 45, respectively. A gap between the second electrical path 82 and the housing case 45 is sealed by a sealing member (not shown) and insulated.

Because the present embodiment has the structure in which a part of the second electrical path 82 is arranged inside of the housing case 45, the second electrical path 82 is made of corrosion resistant materials to lithium hexafluorophosphate contained in the electrolyte 43. Specifically, a first detection line 82a is made of aluminum, and a second detection line 82b is made of stainless steel (SUS). It is possible to use a member coated with insulating resin such as polyimide resin as the first detection line 82a and the second detection line 82b, and to use a member such as SUS304 as the second detection line 82b.

The present embodiment provides the magnetic flux passage area S10 surrounded by the electrolyte 44 and the second electrical path 82. The magnetic flux generated due to the alternating current signal flowing through the first electrical path 81 is passing through the magnetic flux passage area S10. In this embodiment, the magnitude of the magnetic flux passage area S10 in the housing case 45 is set to be small, so that the magnitude of the magnetic flux passage area S10 is set to be small.

Specifically, the present embodiment sets the magnitude of the magnetic flux passage area S10 so as for the error of the complex impedance derived from the induced electromotive force generated in the second electrical path 82 to be within a range of ±1 mΩ.

A description will now be given of the desirable error range of the complex impedance derived from the induced electromotive force generated in the second electrical path 82. FIG. 6 illustrates a relationship between the battery capacity (Ah) of the battery 40 and required impedance measurement accuracy. The required impedance measurement accuracy indicates the required accuracy necessary for obtaining a zero-crossing point. As shown in FIG. 6A to FIG. 6D, it can be understood that the required impedance measurement accuracy varies according to the battery temperature (° C.) of the battery 40. According to the results shown in FIG. 6A to FIG. 6D, when the battery capacity is 25 Ah to 800 Ah and the battery temperature is −10° C. to 65° C., the error of the complex impedance is derived from the induced electromotive force generated in the second electrical path 82 due to the alternating current signal flowing through the first electrical path 81, and when the magnitude of the magnetic flux passing region S10 is set such that the error of the complex impedance is within a range of +170μΩ, this structure can provide the required impedance measurement accuracy under the battery capacity range and the battery temperature range previously described.

A description will now be given of a method of determining the error of the complex impedance derived from the induced electromotive force generated in the second electrical path 82 due to the alternating current signal flowing through the first electrical path 81.

The formula (2) represents a calculating formula of the complex impedance (Zm) calculated by the controller 53. In the formula (2), Is designates an alternating current signal flowing through the first electrical path 81, Vs designates a component obtained by subtracting a direct current voltage component from an inter-terminal voltage of the battery 40, i.e. represents a voltage variable component (a voltage variation) in a modulation, j designates an imaginary unit, ωr designates a measurement frequency as the alternating current frequency when the alternating current signal Is is measured, and ΣV designates a shape parameter derived from the induced electromotive force generated in the second electrical path 82. The shape parameter ΣV is proportional to the magnitude of the second electrical path 82. Zb represents a complex impedance represented by a ratio of Vs to Is.

$$Zm = \frac{-Vs + j\omega r \sum V \cdot Is}{Is} = -\frac{Vs}{Is} + j\omega r \sum V = -Zb + j\omega r \sum V \qquad (2)$$

Because, almost no current flows in the voltmeter 52, almost no current flows in the second electrical path 82. Accordingly, the induced electromotive force generated in the second electrical path 82 does not affect a self-inductance due to the alternating current signal flowing through the second electrical path 82. It can be considered for the mutual inductance induced due to the alternating current signal flowing through the first electrical path 81 to affect the induced electromotive force generated in the second electrical path 82. The shape parameter ΣV can be expressed by ΣV=±Σ when MV represents the magnitude of the mutual inductance between the first electrical path 81 and the second electrical path 82. The formula (2) can be converted to the following formula (3).

$$Zm = -Zb \pm j\omega rMV \qquad (3)$$

The error of the complex impedance derived from the induced electromotive force generated in the second electrical path 82 due to the alternating current signal flowing through the first electrical path 81 can be expressed by Zb−Zm (=±jωrMV) based on the formula (3). It is possible to measure the measurement frequency or at the time when the alternating current signal is measured. The mutual inductance MV can be calculated by actual measurement and a simulation using the magnitude of the magnetic flux passage area S10 and a distance between the first electrical path 81 and the second electrical path 82. Accordingly, it is possible to specify, by using the formula (3), the error of the complex impedance derived from the induced electromotive force generated in the second electrical path 82 due to the alternating current signal flowing through the first electrical path 81.

Under the predetermined measurement conditions, the present embodiment sets the magnitude of the magnetic flux passage area S10, i.e., the shape parameter $\Sigma V$ (=±MV) so that the error expressed by the formula (3) becomes within the previously described range (±1 m$\Omega$, ±170μ$\Omega$). The predetermined measurement conditions represent the battery capacity range of 25 Ah to 800 Ah, and the temperature range of −10° C. to 65° C.

The present embodiment provides the structure of the second electrical path 82 so that the magnetic flux passage area S10 becomes smaller in magnitude than the area S13 (see FIG. 5A) surrounded by the electrode body 44, the positive electrode conductor 47a, the negative electrode conductor 47b and the housing case 45. Specifically, the second electrical path 82 is wired in the following structure.

As shown in FIG. 2, the second electrical path 82 has the first detection line 82a and the second detection line 82b. The voltmeter 52 is connected to the positive electrode 44e of the electrode body 44 through the first detection line 82a. The voltmeter 52 is also connected to the negative electrode 44f of the electrode body 44 through the second detection line 82b.

The first detection line 82a is wired along the second detection line 82b to a predetermined branch node Br in the housing case 45. That is, the first detection line 82a and the second detection line 82b are wired in parallel so that there is as little gap as possible. The first detection line 82a is separated at the predetermined branch node Br from the second detection line 82b. The first detection line 82a extends from the predetermined branch node Br to the positive electrode 44e, and the first detection line 82a is connected to the positive electrode 44e. The second detection line 82b also extends from the predetermined branch node Br to the negative electrode 44f, and the second detection line 82b is connected to the negative electrode 44f.

FIG. 2 shows the structure in which the first detection line 82a from the voltmeter 52 to the predetermined branch node Br, and the second detection line 82b from the voltmeter 52 to the predetermined branch node Br are wired orthogonally to the axial direction X of the electrode body 44. However, the present disclosure is not limited by this structure. As long as the first detection line 82a and the second detection line 82b are wired along each other, they may be wired in any manner. When the first detection line 82a and the second detection line 82b are wired along each other, it is not necessary to wire them in a straight line; they may bend arbitrarily as long as they follow the same curvature. Each of the first detection line 82a and the second detection line 82b is covered with an insulating cover. It is also acceptable to arrange the first detection line 82a and the second detection line 82b with a necessary gap so as to insulate them from each other.

The branch node Br is arranged at a location adjacent to the electrode body 44, between the positive electrode 44e and the negative electrode 44f of the electrode body 44. The first detection line 82a is wired along the outer surface of the electrode body 44 in the direction from the branch node Br to the positive electrode 44e. The second detection line 82b is wired along the outer surface of the electrode body 44 in the direction from the branch node Br to the negative electrode 44f.

A description will be given of the actions obtained by the arrangement of the second electrical path 82 previously described.

Figure 5A:
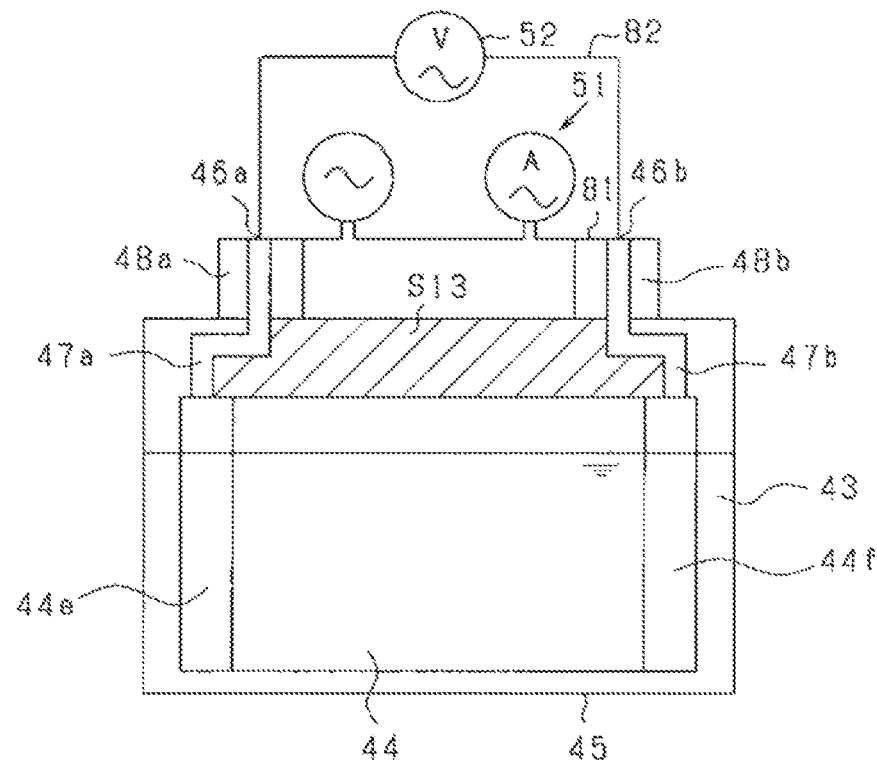
FIG. 5A and FIG. 5B are views explaining a magnet flux passage area, and showing a second electrical path.

FIG. 5A shows a comparative example of the area S13 as the magnetic flux passage area S10 in the housing case 45. The comparative example provides a structure in which the second electrical path 82 is connected outside of the housing case 45 to the positive electrode external terminal 46a and the negative electrode external terminal 46b.

In the structure of the comparative example, the second electrical path 82 is connected to the electrode body 44 through the positive electrode conductor 47a and the negative electrode conductor 47b. The comparative example provides the area S13 surrounded by the electrode body 44, the positive electrode conductor 47a, the negative electrode conductor 47b and the housing case 45.

Figure 5B:
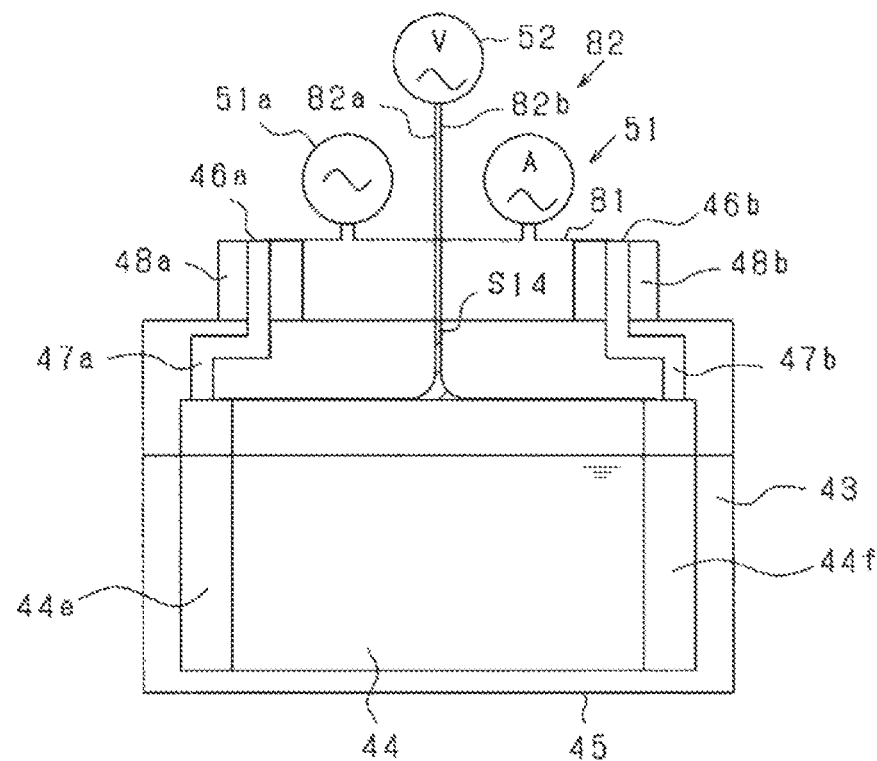
Figure 6A:
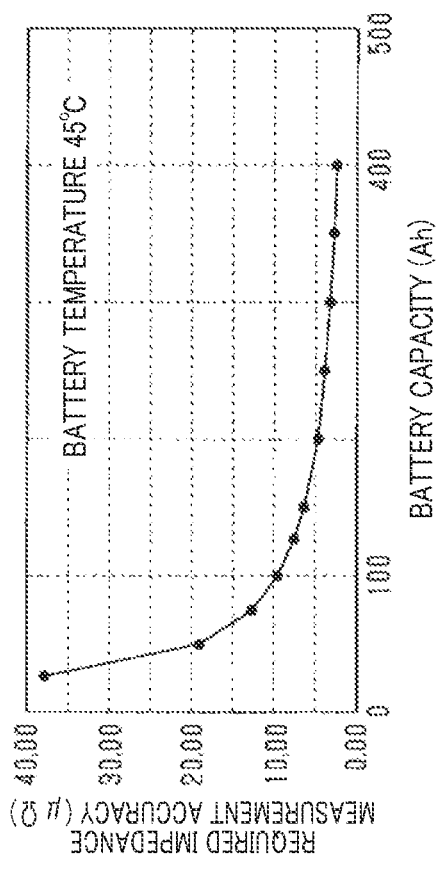
FIG. 6A to FIG. 6D are views explaining a relationship between impedance measurement accuracy and battery volume, and showing the magnetic flux passage area.
Figure 6B:
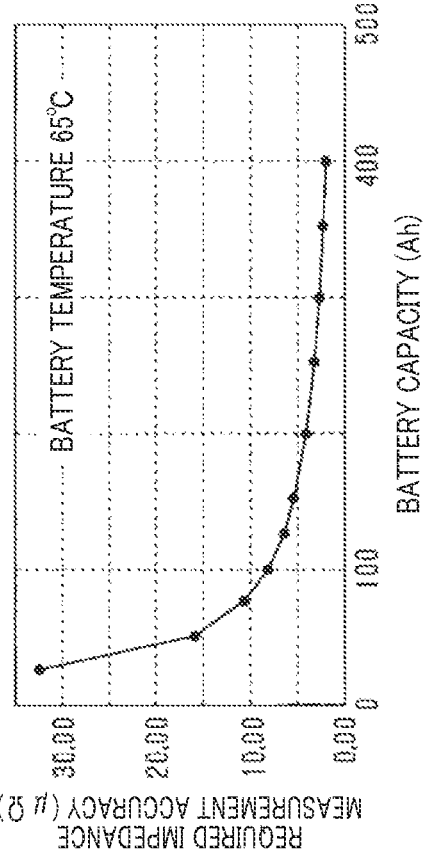
Figure 6C:
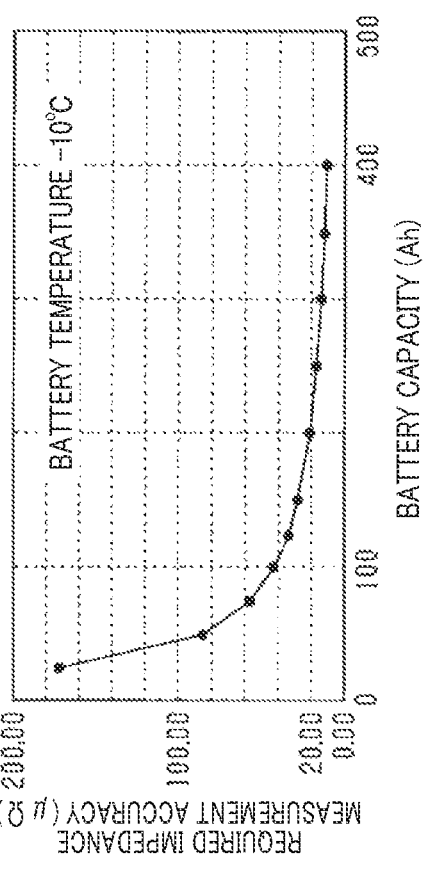
Figure 6D:
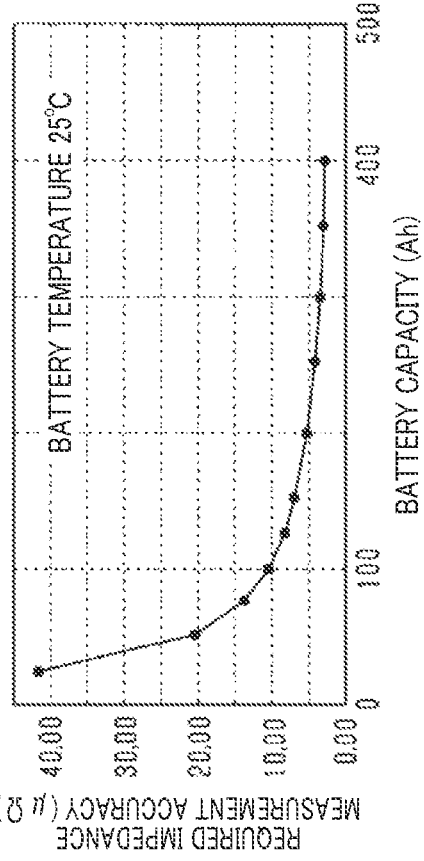

On the other hand, the present embodiment provides the improved structure in which the first detection line 82a is wired along the second detection line 82b to the branch node Br. This structure makes it possible to reduce the magnitude of an area S14 as the magnetic flux passage area S10 from the voltmeter 52 to the branch node Br. Further, the branch node Br is arranged at the location between the positive electrode 44e and the negative electrode 44f of the electrode body 44, provided in contact with the electrode body 44. Further, the first detection line 82a and the second detection line 82b are wired in contact with the outer surface of the electrode body 44, extending from the branching node Br toward the corresponding one of the positive electrode 44e and the negative electrode 44f of the electrode body 44. This structure makes it possible to suppress the magnitude of the area S14 located from the branch node Br to the positive electrode 44e and the negative electrode 44f. Accordingly, as shown in FIG. 5B, the area S14 has a reduced area surrounded by the branch node Br, the first detection line 82a, the second detection line 82b and the electrode body 44, when compared with the magnitude of the area S13 shown in the comparative example. As previously described, the present embodiment provides the reduced magnitude of the magnetic flux passage area S10 in the housing case 45 when compared with the magnitude flux passage area in the comparative example.

Figure 7:
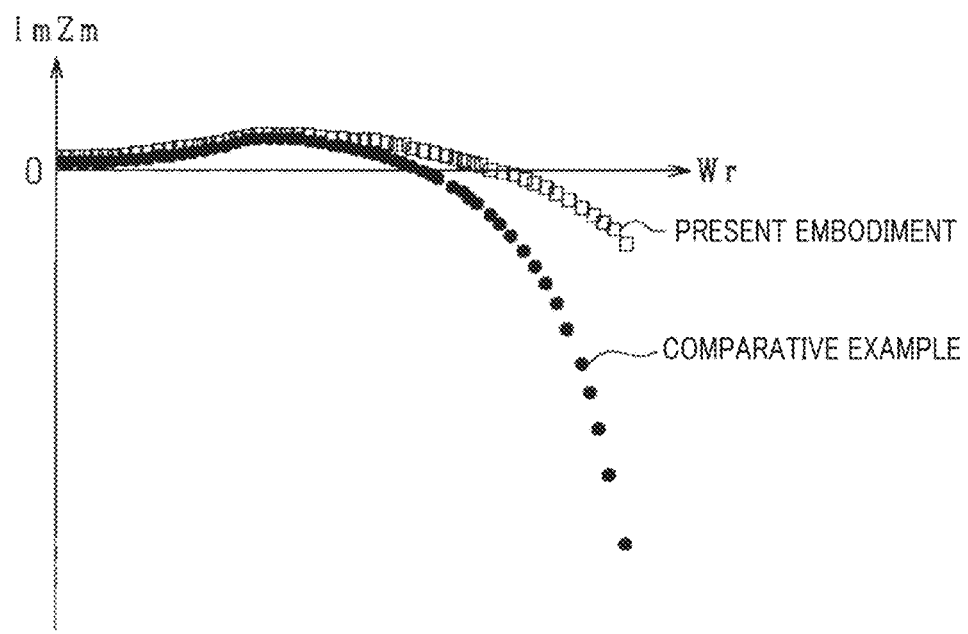
FIG. 7 is a graph showing a relationship between an imaginary part of a complex impedance and a measurement frequency.

FIG. 7 shows the relationship between the imaginary part (ImZm) of the complex impedance and the measurement frequency or. In FIG. 7, the present embodiment has the reduced magnitude of the magnetic flux passage area S10 when compared with that of the comparative example because the area S14 of the present embodiment is smaller in magnitude than the area S13 of the comparative example. As designated by the square marks shown in FIG. 7, the present embodiment makes it possible to suppress the reduction of the imaginary part of the complex impedance at the high frequency area when compared with the comparative example designated by the circular marks.

Figure 8:
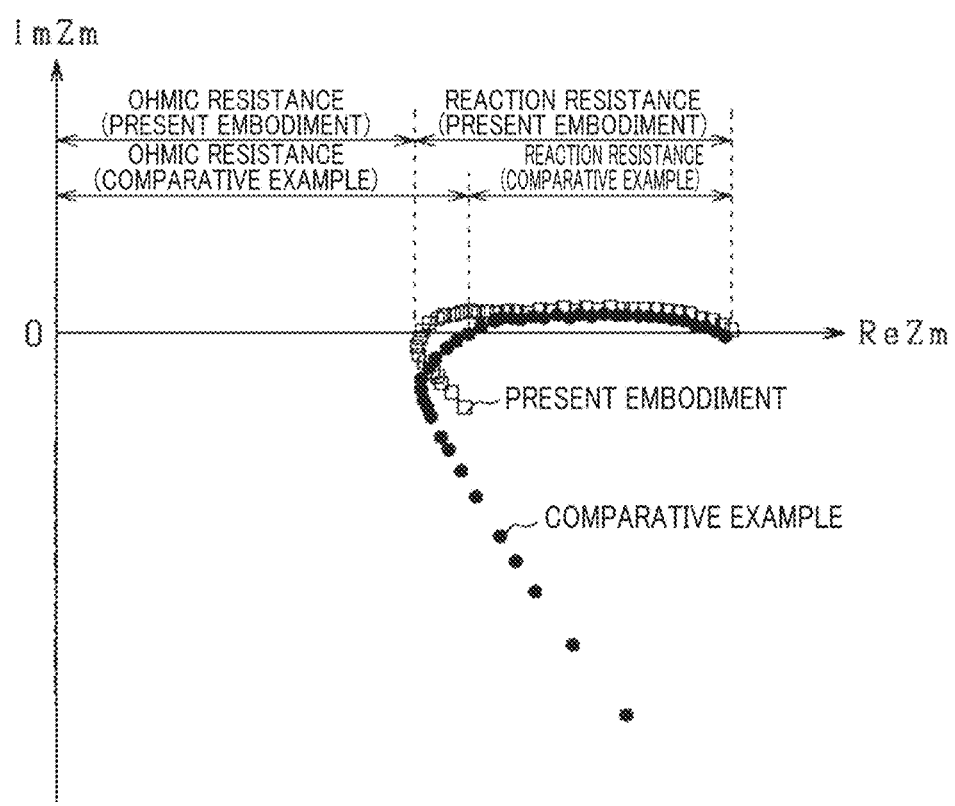
FIG. 8 is a graph showing plane plots on a complex impedance plane.

FIG. 8 shows the plane plots on the complex impedance plane of the present embodiment and the comparative example. As shown in FIG. 8, the reduction of the imaginary part is suppressed in the present embodiment when compared with the reduction of the imaginary part in the comparative example. This makes it possible for the plane plots in the present embodiment designated by the square marks to have the reduced ohmic resistance 41 and the increased reaction resistance 42 when compared with those in the comparative example. That is, when compared with the comparative example, the present embodiment provides the structure to suppress the error of the complex impedance due to the induced electromotive force.

A description will be given of the effects according to the present embodiment previously described in detail.

The present disclosure provides the improved structure in which the second electrical path 82 is wired inside of the housing case 45, and the second electrical path 82 is connected to the positive electrode 44e and the negative electrode 44f of the electrode body 44 in the inside of the housing case 45. Further, the second electrical path 82 is wired such that the area S14 is formed smaller than the area S13 surrounded by the electrode body 44, the positive electrode conductor 47a, the negative electrode conductor 47b, and the housing case 45. This structure makes it possible to provide the reduced magnetic flux passage area S10 in the inside of the housing case 45 when compared in magnitude with that of the comparative example in which the second electrical path 82 is connected outside of the housing case 45 to the positive electrode external terminal 46a and the negative electrode external terminal 46b. Further, this structure makes it possible to suppress error generation of the complex impedance.

According to the present embodiment, the area S14 has the appropriate magnitude so that the error of the complex impedance, derived from the induced electromotive force generated in the second electrical path 82 due to the alternating current signal flowing through the first electrical path 81, becomes within the range of γ1 mΩ. This structure makes it possible to correctly suppress the error of the complex impedance due to the induced electromotive force.

According to the present embodiment, it is possible to further suppress the error of the complex impedance, derived from the induced electromotive force, by adjusting the magnitude of the area S14 appropriately when the battery capacity of the battery 40 is within the range of 25 Ah to 800 Ah, and the battery temperature is within the range of −10° C. to 65° C.

According to the present embodiment, because the first detection line 82a is wired along the second detection line 82b to the predetermined branch node Br in the housing case 45, this structure makes it possible to suppress the magnitude of the area S14 to the branch node Br. Further, the branch node Br is located between the positive electrode 44e and the negative electrode 44f of the electrode body 44, and provided in contact with the electrode body 44. The first detection line 82a and the second detection line 82b are wired in contact with the outer surface of the electrode body 44, extending from the branch node Br toward the corresponding one of the positive electrode 44e and the negative electrode 44f of the electrode body 44. This arrangement makes it possible to suppress the magnitude of the area S14 from the branch node Br to the positive electrode 44e and the negative electrode 44f. This makes it possible to suppress the magnitude of the area S14 and to suppress the error of the complex impedance.

When a part of the second electrical path 82 is wired inside of the housing case 45, there is a possible occurrence of it deteriorating the second electrical path 82 by the electrolyte 43. In order to avoid this, the present embodiment provides the structure in which the second electrical path 82 is made of corrosion resistant materials to the electrolyte 43. This makes it possible to suppress the corrosion of the second electrical path 82, and to calculate the complex impedance.

Specifically, lithium hexafluorophosphate contained in the electrolyte 43 has corrosion characteristics of corroding (dissolving) specific metal such as iron. Aluminum fluoride film is formed on the surface of aluminum by lithium hexafluorophosphate, and chromium trifluoride film is formed on the surface of the stainless steel by lithium hexafluorophosphate. Because those films are a passivation film of lithium hexafluorophosphate, this suppresses occurrence of reaction after the film formation process. The present embodiment provides the structure in which the first detection line 82a is made of aluminum, and the second detection line 82b is made of stainless steel. This formation of the passivation film makes it possible to suppress the corrosion (dissolving) of the first detection line 82a and the second detection line 82b, and possible thereby to calculate the complex impedance.

Because the wiring resistance of stainless steel is greater than that of copper, in the second electrical path 82, the wiring resistance increases by the formation of the passivation film. However, because almost no alternating current signal flows through the second electrical path 82, increasing of the wiring resistance of the second electrical path 82 does not affect the calculation accuracy of the complex impedance.

(Modification of first embodiment)

Figure 9:
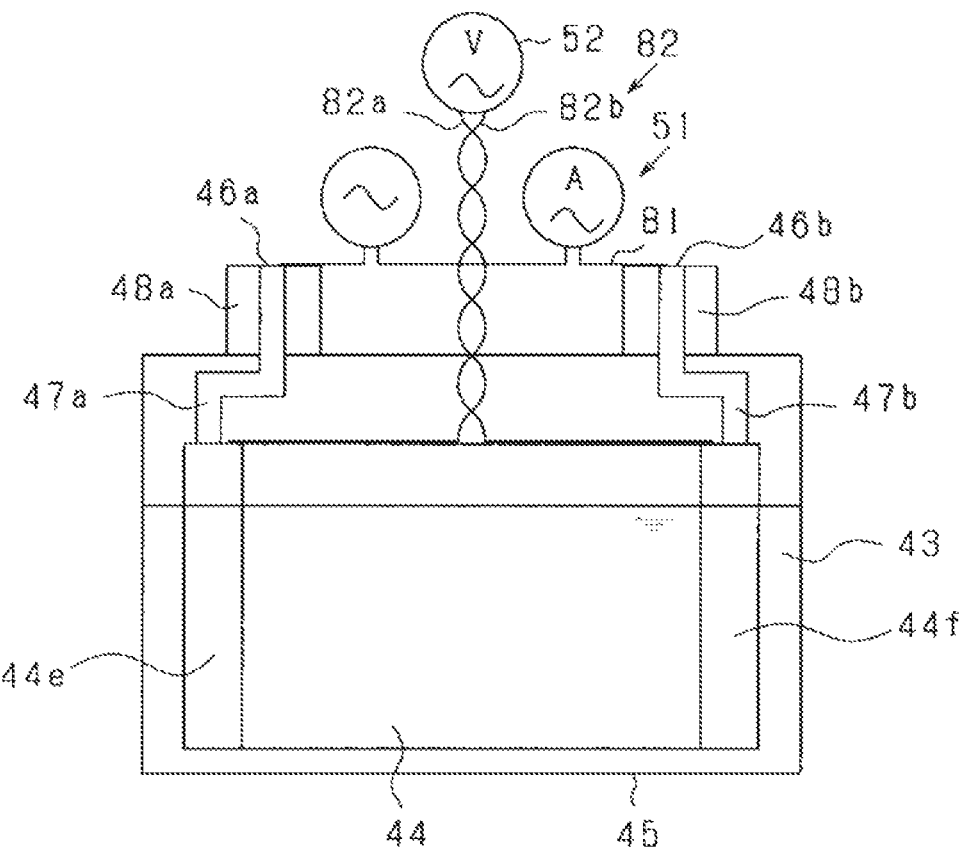
FIG. 9 is a view showing a connection structure of the battery and the battery measurement device.

A description will be given of a modification of the first embodiment. As shown in FIG. 9, the first detection line 82a and the second detection line 82b are wired crossing each other multiple times outside and inside the housing case 45.

Figure 10:
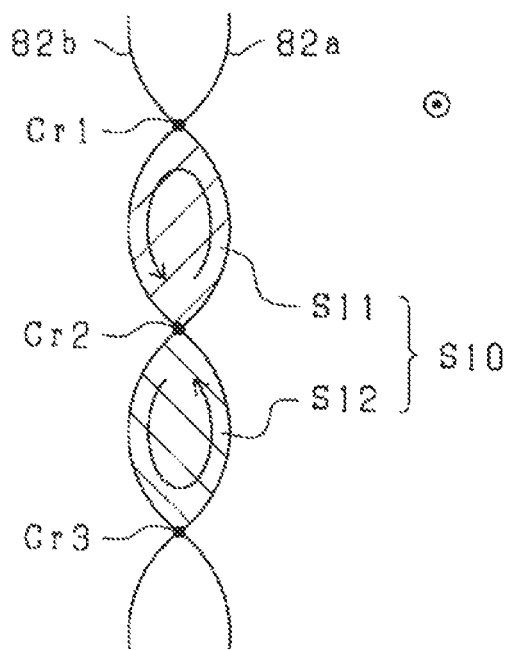
FIG. 10 is a view explaining the second electrical path.

In more detail, as shown in FIG. 10, the first detection line 82a and the second detection line 82b intersect each other at first to third intersection nodes Cr1, Cr2 and Cr3. This structure provides the magnetic flux passage area S10 divided into multiple divided areas including a first magnetic flux passage area S11 and a second magnetic flux passage area S12. The first magnetic flux passage area S11 is surrounded by the first intersection node Cr1, the second intersection node Cr2, the first detection line 82a and the second detection line 82b. The second magnetic flux passage area S12 is surrounded by the second intersection node Cr2, the third intersection node Cr3, the first detection line 82a and the second detection line 82b.

For example, when the alternating current signal is flowing in the first electrical path 81, the magnetic fluxes are generated in the first magnetic flux passage area S11 and the second magnetic flux passage area S12 from the back of the paper to the front of the paper. In this case, the current due to the induced electromotive force is flowing counterclockwise in the first magnetic flux passage area SI and the second magnetic flux passage area S12 as shown in FIG. 10. Because the first detection line 82a and the second detection line 82b are arranged opposite each other at the second intersection node Cr2, the induced electromotive force generated in the first magnetic flux passage area S11 is shifted in phase by 180° from the induced electromotive force generated in the second magnetic flux passage area S12. The induced electromotive force generated in the first magnetic flux passage area S11 and the induced electromotive force generated in the second magnetic flux passage area S12 are cancelled each other. This structure makes it possible to suppress the induced electromotive force due to the alternating current signal from being generated in the second electrical path 82.

Second Embodiment

A description will be given of the second embodiment. In the following description, the same components and equivalents thereof between the preferred embodiments will be referenced with the same reference numbers and characters, and the explanation of the same components is omitted for brevity. The second embodiment has the basic structure disclosed by the first embodiment.

Figure 11:
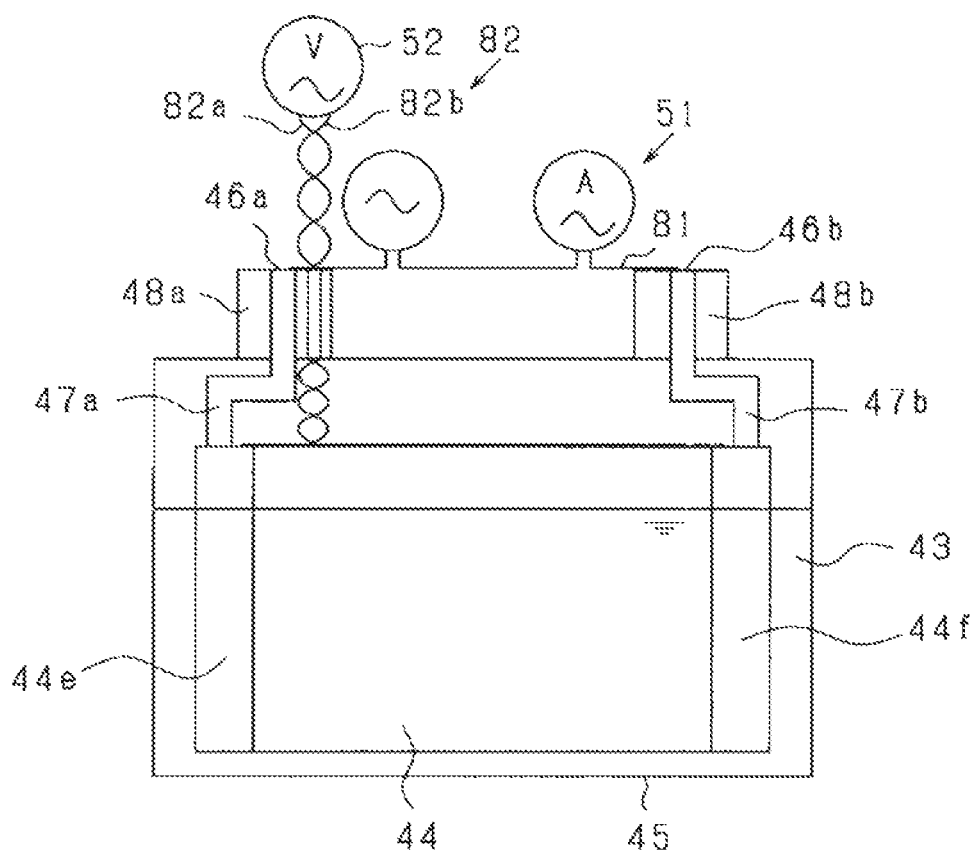
FIG. 11 is a view showing a connection structure of the battery and the battery measurement device according to a second embodiment.

As shown in FIG. 11, the second embodiment provides the structure in which the second electrical path 82 extends outside from the housing case 45 through a positive electrode sealing member 48a of the positive electrode conductor 47a. That is, the positive electrode conductor 47a and the housing case 45 are sealed with the positive electrode sealing member 48a. In addition, the second electrical path 82 and the housing case 45 are also sealed with the positive electrode sealing member 48a. This provides the battery 40 having a simple structure, and makes it possible to reduce the manufacturing cost of the battery 40.

As shown in FIG. 11, the second electrical path 82 has a stranded wire structure in which the first detection line 82a and the second detection line 82b cross each other multiple times, outside the positive electrode sealing member 48a. It is preferable for the first detection line 82a and the second detection line 82b to be wired in parallel inside of the positive electrode sealing member 48a. This structure makes it possible to suppress excess reduction in distance between the positive electrode conductor 47a and the first detection line 82a and between the positive electrode conductor 47a and the second detection line 82b in the positive electrode sealing member 48a.

Third Embodiment

A description will be given of the third embodiment. In the following description, the same components and equivalents thereof between the preferred embodiments will be referenced with the same reference numbers and characters, and the explanation of the same components is omitted for brevity. The third embodiment has the basic structure disclosed by the first embodiment.

Figure 12A:
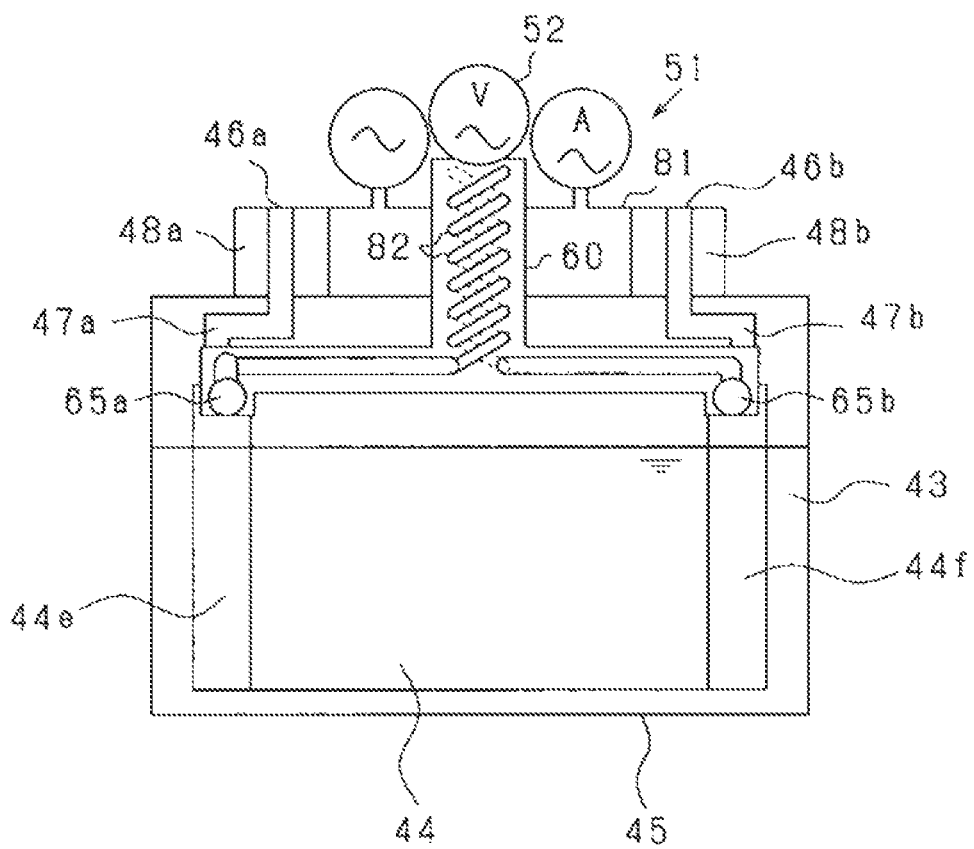
FIG. 12A and FIG. 12B are views showing a connection structure of the battery and the battery measurement device according to a third embodiment.
Figure 12B:
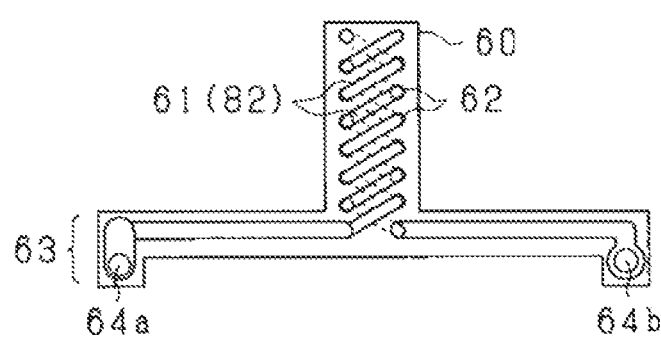

As shown in FIG. 12A, the third embodiment provides the structure in which the second electrical path 82 is wired on a flexible substrate 60. As shown in FIG. 12B, the flexible substrate 60 is made of polyimide base material having corrosion resistance to fluorine, for example. The second electrical path 82 is formed by using a planar metal foil 61 printed on the flexible substrate 60. As previously described, because almost no current flows in the second electrical path 82, the use of the second electrical path 82 does not affect the calculation accuracy of the complex impedance even when the second electrical path 82 is made of metal foil 61 having a small cross section with relatively high wiring resistance.

The flexible substrate 60 adheres closely to the metal foil 61, and the flexible substrate 60 and the metal foil 61 are sealed so as to prevent the electrolyte 43 from penetrating into a gap between the flexible substrate 60 and the metal foil 61. The metal foil 61 is formed on both surfaces of the flexible substrate 60, and has a stranded wire structure in which the metal foils 61 corresponding to the first detection line 82a and the second detection line 82b alternately cross each other by using through holes 62 formed in the flexible substrate 60. This stranded wire structure using the flexible substrate 60 makes it possible to enhance the productivity of the second electrical path 82, which is higher than the productivity obtained from the stranded wire structure using round wire or bare wire. A part of the flexible substrate 60 extends outside of the housing case 45, and connected to the voltmeter 52. A gap between the flexible substrate 60 and the housing case 45 is sealed with a sealing member (not shown). The flexible substrate 60 is insulated from the housing case 45 through the sealing member.

A neighbor part 63 of the metal foil 61 formed on the flexible substrate 60, in contact with the positive electrode 44e of the electrode body 44, is made of aluminum foil, and the other part thereof is made of copper foil. The aluminum foil and the copper foil are electrically connected each other on the flexible substrate 60. A positive electrode side connection part 64a and a negative electrode side connection part 64b are formed on the flexible substrate 60. The positive electrode side connection part 64a is connected to the positive electrode 44e of the electrode body 44. The negative electrode side connection part 64b is connected to the negative electrode 44f of the electrode body 44. As shown in FIG. 12A, the positive electrode side connection part 64a is connected to the positive electrode 44e of the electrode body 44 through an aluminum rivet 65a, and the negative electrode side connection part 64b is connected to the negative electrode 44f of the electrode body 44 through an aluminum rivet 65b.

The present embodiment provides the structure in which the positive electrode side connection part 64a and the negative electrode side connection part 64b are formed by using the planar metal foil 61, as well as the second electrical path 82. The positive electrode side connection part 64a and the negative electrode side connection part 64b are connected by face to the positive electrode 44e and negative electrode 44f of the electrode body 44. This structure makes it possible to increase the contact area between them and to disperse the contact pressure more than that when the second electrical path 82 is made of round wire or bare wire. Further, this structure makes it possible to suppress a current from being concentrated into a contact point, and to avoid the electrode body 44 from being damaged.

Fourth Embodiment

A description will be given of the fourth embodiment. In the following description, the same components and equivalents thereof between the preferred embodiments will be referenced with the same reference numbers and characters, and the explanation of the same components is omitted for brevity. The fourth embodiment has the basic structure disclosed by the first embodiment.

Figure 13:
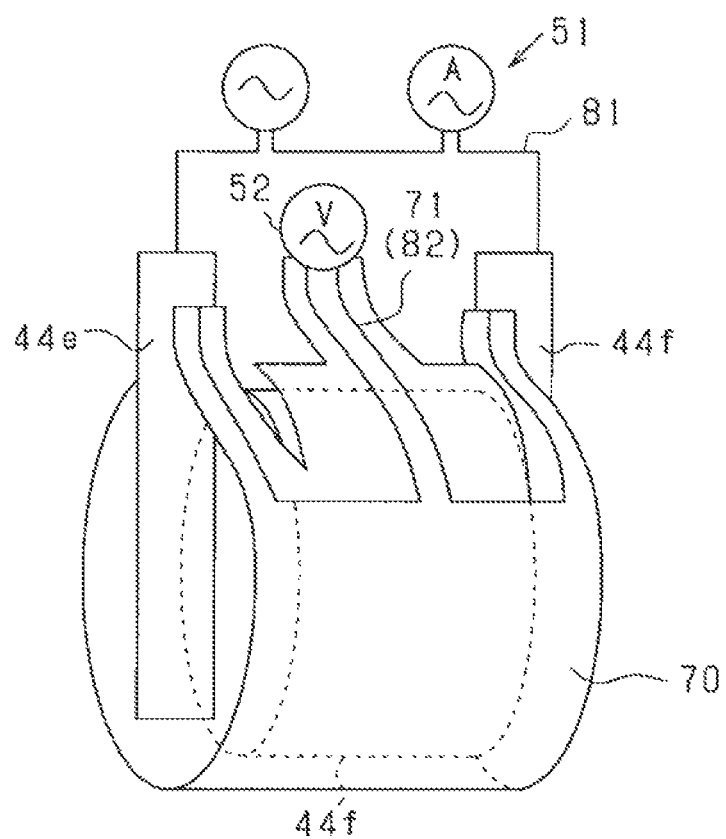
FIG. 13 is a view showing a connection structure of the battery and the battery measurement device according to a fourth embodiment.

As shown in FIG. 13, the fourth embodiment provides the structure in which the electrode body 44 is covered with an insulating cover 70, and the second electrical path 82 is formed on the insulating cover 70. The insulating cover 70 is made of a polyimide film, and the second electrical path 82 is made of a planar metal foil 71 printed on the insulating cover 70, similar to the structure disclosed in the third embodiment. The electrolyte 43, the housing case 45, the positive electrode conductor 47a and the negative electrode conductor 47b are omitted from FIG. 13. FIG. 13 shows a gap between the electrode body 44 and the insulating cover 70. It is preferable to reduce the gap between the electrode body 44 and the insulating cover 70 as narrow as possible, and preferable to thereby reduce the magnitude of the magnetic flux passage area S10 in the inside of the housing case 45.

A part of the insulating cover 70 extends outside of the housing case 45, and connected to the voltmeter 52. A gap between the insulating cover 70 and the housing case 45 is sealed and insulated by using a sealing member (not shown). The other part of the insulating cover 70 is connected to the positive electrode 44e and the negative electrode 44f of the electrode body 44 in the inside of the housing case 45. The fourth embodiment uses the insulating cover 70 covering the electrode body 44 to form the second electrical path 82. This structure makes it possible to provide the battery 40 having a simple structure, and to reduce the manufacturing cost of the battery 40.

Other Embodiments

In the above embodiments, the alternating current signal is not limited to a sine wave signal as the alternating current signal. For example, it is acceptable to use a square wave signal, and a sine wave signal. It is also acceptable to use, as the alternating current signal, a synthetic wave of any frequency including the measurement frequency or.

In the modification of the first embodiment previously described, the magnetic flux passage area S10 is divided into more than three divided areas, however it may be divided into two divided areas. In this case, the first detection line 82a and the second detection line 82b cross each other one time.

In the embodiments previously described, the calculation unit such as the controller 53 53 does not need to calculate the complex impedance, and may calculate information regarding the complex impedance. For example, the information regarding the complex impedance represents interim information necessary for calculating the complex impedance (for example, a real part and an imaginary part of a current and voltage). It is acceptable for an external device to calculate the final result, such as the real part and imaginary part of the complex impedance.

The embodiments previously described shows the example in which the battery 40 receives the predetermined alternating current signal. It is also acceptable to instruct the battery 40 to output the alternating current signal so as to occur a disturbance in the battery 40. For example, it is acceptable for the current modulation circuit 51 to have a structure in which a series circuit of a resistance element and a switch is connected to the first electrical path 81, instead of using the oscillator 51a. In this structure, the controller 53 transmits an instruction signal to the switching part so as to perform the open and close operation of the switch, and the battery 40 outputs the alternating current signal based on the instruction signal.

When the battery 40 has an explosion-proof valve, it is acceptable to wire the second electrical path 82 through the explosion-proof valve.

The embodiments previously described show the structure in which the battery measurement device 50 is applied to a power source system of vehicles. It is also possible to apply the battery measurement device 50 to power sources systems for electric aircrafts and electric ships.

The controller and the method according to the present disclosure may be implemented by a dedicated computer which is provided by configuring a processor and a memory that are programmed to execute one or more embodied functions. Alternatively, the controller and the method according to the present disclosure may be implemented by a dedicated computer which is provided by configuring a processor with one or more dedicated hardware logic circuits. Alternatively, the controller and the method according to the present disclosure may be implemented by one or more dedicated computers which are configured by combining a processor and a memory that are programmed to perform one or more functions, with a processor that is configured by one or more hardware logic circuits. Furthermore, the computer programs may be stored in a computer readable non-transitory tangible recording medium, as instructions to be executed by the computer.

The present disclosure has been described in conformity with the embodiments. However, it is comprehended that the present disclosure is not limited to the embodiments or structures. The present disclosure includes various modified examples and modifications within the range of equivalency. In addition, various combinations and forms or other combinations and forms including only one additional element, two or more additional elements, or a portion of one additional element are also included in the scope of the present disclosure or the range of ideas.

What is claimed is:

1. A battery measurement system comprising a battery and a battery measurement device, the battery measurement device measuring a state of the battery, wherein
the battery comprises:
an electrolyte,
an electrode body having a pair of electrodes,
a housing case that accommodates the electrolyte and the electrode body, and
a pair of terminals, each of the pair of terminals being connected to a corresponding one of the pair of electrodes, and at least a part of the pair of terminals projecting outside from an outer surface of the housing case,
the battery measurement device comprises:
a signal control unit provided on a first electrical path and configured to cause the battery to output a predetermined alternating current signal, or apply the predetermined alternating current signal to the battery, the first electrical path connecting a positive external terminal and a negative external terminal which project outside from the outer surface of the housing case among the pair of terminals;
a response signal input unit provided on a second electrical path and configured to receive a response signal to the alternating current signal provided from the battery via the second electrical path, the second electrical path connecting a positive electrode and a negative electrode of the electrode body, and
a calculation unit configured to calculate information regarding a complex impedance of the battery based on the response signal,
wherein the second electrical path is wired from the response signal input unit arranged outside of the battery toward the inside of the housing case, and is connected to the positive electrode and the negative electrode of the electrode body inside the housing case,
a magnetic flux passage area is formed, which is surrounded by the electrode body and the second electrical path, and through which a magnetic flux generated based on an alternating current signal flowing through the first electrical path passes, and
the second electrical path is wired inside of the housing case so that the magnetic flux passage area inside the housing case is smaller in magnitude than an area surrounded by the electrode body, the pair of terminals and the housing case.

2. The battery measurement system according to claim 1, wherein the magnitude of the magnetic flux passage area is set so that an error of the complex impedance, derived from an induced electromotive force generated in the second electrical path based on the alternating current signal flowing through the first electrical path, is within a range of ±1 mΩ.

3. The battery measurement system according to claim 2, wherein when the battery has a battery capacity within a range of 25 Ah to 800 Ah, and the battery has a temperature within a range of −10° C. to 65° C., the magnitude of the magnetic flux passage area is set so that the error of the complex impedance derived from the induced electromotive force generated in the second electrical path based on the alternating current signal flowing through the first electrical path is within a range of +170µΩ.

4. The battery measurement system according to claim 1, wherein the electrode body comprises a positive electrode conductive plate, a negative electrode conductive plate, and a separator sandwiched between the positive electrode conductive plate and the negative electrode conductive plate, and a laminated body of the positive electrode conductive plate, the separator, and the negative electrode conductive plate is wound to form a winding body, and the positive electrode and the negative electrode are formed on both sides of the winding body, wherein the second electrical path comprises a first detection line and a second detection line, the response signal input unit is connected to the positive electrode through the first detection line, and the response signal input unit is connected to the negative electrode through the second detection line, the first detection line is wired along the second electrical path to a predetermined branch node in the inside of the housing case, the branch node is arranged between the positive electrode and the negative electrode in the winding body, and is in contact with the winding body, and the first detection line is wired, in contact with the outer surface of the winding body, from the branch node toward the positive electrode, and the second detection line is wired, in contact with the outer surface of the winding body, from the branch node toward the negative electrode.

5. The battery measurement system according to claim 4, wherein the first detection line and the second detection line are wired inside of the housing case to cross each other at least once.

6. The battery measurement system according to claim 1, wherein
the electrolyte has corrosive characteristics to a specific metal, and
a part of the second electrical path wired inside of the housing case is made of corrosion resistant material to the electrolyte.

7. The battery measurement system according to claim 6, wherein
the electrolyte contains fluoride, and
the part of the second electrical path wired inside of the housing case is made of material forming a passivation film on its surface by reaction with fluoride.

8. The battery measurement system according to claim 7, wherein a part of the second electrical path wired inside of the housing case is made of aluminum.

9. The battery measurement system according to claim 7, wherein a part of the second electrical path wired inside of the housing case is made of stainless steel.

10. The battery measurement system according to claim 1, wherein
the pair of terminals comprises a positive electrode terminal and a negative electrode terminal,
the battery measurement system further comprises a positive electrode sealing member and a negative electrode sealing member, a gap between the positive electrode terminal and the housing case is sealed with the positive electrode sealing member, and a gap between the negative electrode terminal and the housing case is sealed with the negative electrode sealing member, and
the second electrical path extends outside of the housing case through either the positive electrode sealing member or the negative electrode sealing member.

11. The battery measurement system according to claim 1, wherein the part of the second electrical path wired inside of the housing case is wired on a flexible substrate.

12. The battery measurement system according to claim 1, wherein
the battery comprises an insulating cover, with which the electrode body is covered, and
the part of the second electrical path wired inside of the housing case is wired on the insulating cover.

* * * * *